O. B. STILLMAN & J. H. WEBSTER.
Measuring and Discharging Apparatus for Cooling
Tubes of Char-Furnaces.
No. 199,118. Patented Jan. 8, 1878.
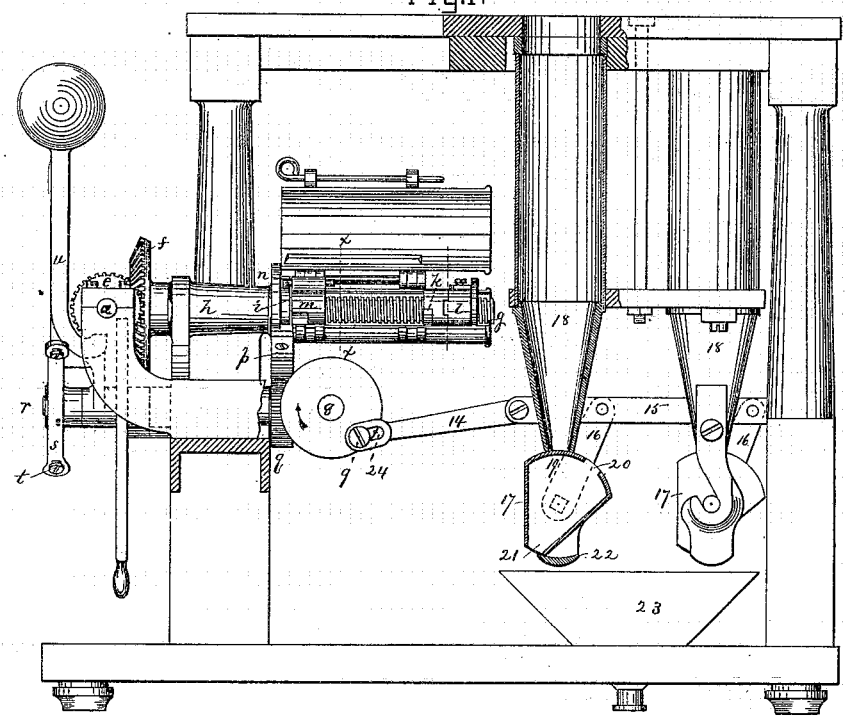
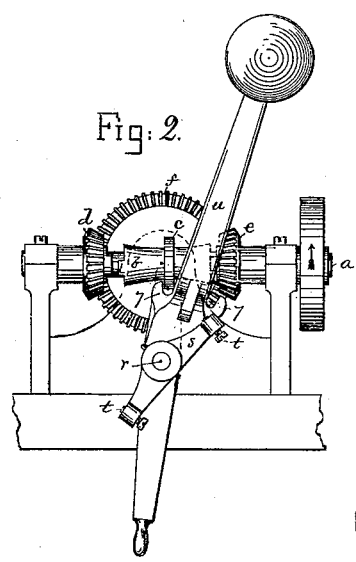
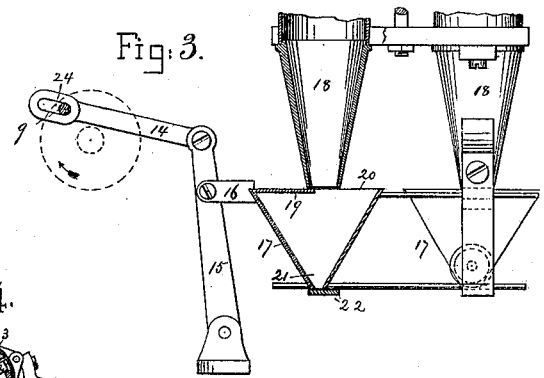
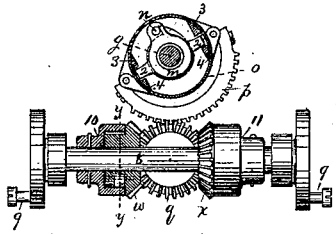
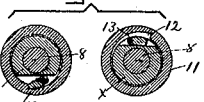
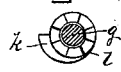
Witnesses.
E. C. Perkins.
H. J. Pratt.
Inventor.
Oscar B. Stillman and John H. Webster
by Crosby & Gregory
Attys

UNITED STATES PATENT OFFICE.

OSCAR B. STILLMAN AND JOHN H. WEBSTER, OF BOSTON, MASSACHUSETTS.

IMPROVEMENT IN MEASURING AND DISCHARGING APPARATUS FOR COOLING-TUBES OF CHAR-FURNACES.

Specification forming part of Letters Patent No. 199,118, dated January 8, 1878; application filed June 19, 1877.

*To all whom it may concern:*

Be it known that we, OSCAR B. STILLMAN and JOHN H. WEBSTER, both of Boston, in the county of Suffolk and State of Massachusetts, have invented an Improvement in Discharging Apparatus for Cooling-Tubes of Bone-Black or Char Furnaces, of which the following is a specification:

This invention relates to apparatus for discharging bone-black or animal char as it passes from the furnaces, which revivify it after it has been used in the filtration of sugar.

The animal char in this apparatus, as in the ordinary way, is revivified or reburned in heating-tubes, from which it passes into cooling-tubes, forming extensions thereof, but preferably made of sheet-iron. These cooling-tubes are usually terminated with small hoppers, provided at bottom with hand-operated slides, which are separately and frequently operated by the attendant, so as to discharge the char at the lower end of the tubes, it being sufficiently cooled. These slides are drawn from once to twice an hour.

To obviate the separate manipulation of the slides or bottom pieces at the lower ends of the cooling-tubes, a long flat bottom plate, provided with discharging-slots, has been moved at intervals, so as to discharge char from all the tubes in a row simultaneously; but in such case the tubes have been arranged to continually discharge the char into separate apartments. Other machines have had rotating cooling-tubes, and below them rotating measuring-boxes arranged above stationary plates provided with holes.

In the plan described in this present invention the lower ends of the cooling-tubes are uncovered at intervals to permit the discharge of the char into measuring-boxes, provided with outlets adapted to be covered by bottom plates, the combination between the cooling-tube, measuring-box, and bottom plate being such that the outlet of the char-box is closed when its cooling-tube is discharging char into it, and when the char-box is discharging its contents the lower end of the tube is closed by a moving plate at or near the top of the measuring-box.

The frequency of the discharge of the char into and from the measuring-box is regulated automatically, so as to take place at any desired intervals, more or less. In practice, it is preferred to draw the char at the extreme lower ends of the tubes in small quantities—say, at intervals of between three and four minutes. By removing the char from the tubes frequently and in small quantities, it is possible to keep up an even burning and a uniform delivery of char.

The invention consists in the combination, with the cooling-tubes, of measuring-boxes arranged to intermittingly receive, cut off the flow of, measure, and discharge the char, as hereinafter described; also, in a cooling-tube for the measuring-box, and a bottom plate, in combination with a measuring-box provided with openings at bottom and top, and with a tube-closing plate, to operate in connection with the lower end of the cooling-tube, whereby the box may both receive and discharge char intermittingly, substantially as described; also, in the combination, with measuring-boxes and tube-closing plates, of mechanism to automatically move such plates to permit the char to be received automatically and intermittingly, as hereinafter set forth.

Figure 1 represents, in side elevation and partially in section, sufficient of a bone-black or char burning furnace to illustrate one embodiment of this invention; Fig. 2, a detail of the reversing-clutch mechanism to rotate the screw-shaft in opposite directions, so that a suitable shaft may be moved at proper intervals to operate the measuring-boxes; Fig. 3, a modified form of measuring-box; Fig. 4, a section on line *x x*, one of the clutch-hubs on the rotating box-moving shaft being shown in longitudinal section. Fig. 5 shows, in cross-section, the box-moving shaft-clutch in two positions; and Fig. 6, a detail showing one of the fingers on the screw-shaft.

The shaft *a*, driven by any suitable pulley or moving-shaft, has upon it a double clutch-sleeve, *b*, provided, in this instance, with a collar, *c*. The sleeve *b* is so fitted upon this shaft by a key that it may be moved longitudinally over, but must rotate with, such shaft. The ends of the sleeve are provided with projections, to engage corresponding projections on either of the clutch-pinions $d\ e$, arranged loosely on shaft $a$. The teeth of the pinions $d\ e$ engage the bevel pinion $f$ on the screw-shaft $g$, supported in a bearing, $h$. This screw-shaft has two fingers, $i\ k$, the latter being preferably adjustable on the screw-shaft, and being held in adjusted position by a notched collar, $l$. Between these two fingers $i\ k$ is placed a traveling nut, $m$, provided with a pin, $n$. This nut has ears 2 2, to enter between projections or ribs 3 4 within a movable casing, $o$, so that as the screw-shaft is moved the nut, held from rotation, will be moved longitudinally along the shaft. A sector, $p$, in this instance connected with the casing $o$, is placed loosely about the screw-shaft, and as the nut reaches the end of its motion in each direction the finger at that end of the screw engages the pin $n$ of the nut and turns it, the casing $o$, and the sector $p$, with the screw-shaft. Such movement operates and partially rotates a pinion, $q$, on a shaft, $r$. The pinion $q$ has bevel-teeth, to engage the bevel-teeth of two pinions, $w\ x$, placed loosely about the rotating shaft 8, which is provided with two crank-pins, 9. Fast on this shaft 8 are two hubs, 10 11, each provided with a notch, 12, to receive the end of a pawl, 13, attached to the loose pinions.

When a pawl engages a notch in a hub the pinion carrying the pawl moves the shaft half a rotation, when the pinion and shaft remain at rest until pinion $q$ is again reversed. Such reversal reverses the pinion which last moved the shaft 8, and frees the pawl, and at the same time the pawl of the other pinion, being at its lowest position, and moved by the pinion $q$, operates the shaft 8 half a rotation in the same direction as before. When one pawl is in engagement the other is free. When a pawl arrives at the top of the shaft it rests until the pinion $q$ is reversed, and when one pawl is disengaged from a notch the other is in position to engage a notch. In this way the sector $p$ oscillates the pinion $q$, which causes the pinion $w$ or $x$, whose pawl is then in engagement with one of the hubs 10 or 11, to move the shaft 8 half a rotation, when it is allowed to rest for a certain length of time. This movement of shaft 8 through the link 14 reciprocates the bar 15, it being connected by suitable arms 16 with the movable measuring-boxes 17, adapted to be intermittingly moved below the stationary cooling-tubes 18, arranged in rows, one behind the other, any desired number of tubes being used in a row.

The actuating mechanism shown in the drawings is adapted to operate the measuring-boxes for two rows of tubes.

The movement of the measuring-boxes may be in the same or opposite directions at the same time, according to the position of the crank-pins.

The boxes shown in Fig. 1 are pivoted so as to be vibrated intermittingly on centers, while those shown in Fig. 3 are arranged to be reciprocated intermittingly, friction-rollers facilitating their movement. At top the boxes have plates 19, to close the cooling-tubes 18, and slots 20, to permit the passage of the revivified or reburned char from the tubes into the measuring-box, according to the position of the plates 19 with reference to the lower end of the tubes. Each measuring-box is provided with an opening, 21, at its lower side, and the bottom of the box is moved over a bottom plate, 22, which serves to retain the char in the box when it is in position to receive char from the tubes 18; but when the box is moved so that its plate 19 covers the lower end of the tube, then the opening at the bottom of the box is carried beyond the bottom plate, and the char in the box is discharged into a suitable receiving-hopper, 23, from which it may be removed, as desired. The openings 20 and 21 are so arranged that the measuring-box does not receive and discharge char at the same time.

The shaft $a$ may be of any desired length, to operate as many rows of boxes as may be necessary. In this plan the boxes are shifted automatically whenever the traveling nut reaches a finger on the screw-shaft. By regulating the distance apart of these fingers the boxes may be moved to receive and discharge char more or less frequently. In this way it is possible to operate the different boxes connected with the one line-shaft $a$ at different orders of time, so that the power exerted to operate the boxes may be expended gradually. This gives the shaft less shock than were all the boxes of all the rows shifted simultaneously.

It will be observed that the links 14 are provided with slots 24.

In operation, the crank-pins, having moved the boxes and reversed the clutch, rest a little above or below the plane of a horizontal line projected through the center of shaft 8, as shown in Figs. 1 and 3, which represent the two positions of rest of such cranks. While the crank-pins were moving from the plane of a horizontal line drawn through the center of the shaft 8 to the positions shown in the drawings, the pins moved in the slots without moving the links or the boxes, thereby providing for lost motion, and during such short movement of the crank the shaft 8 and the devices directly moving it, commencing with the sleeve $b$, were practically free from strain. When the pinion $q$ was moved to operate the shaft 8 and boxes, the shaft $r$, connected with pinion $q$, was also rocked. This shaft $r$ has upon it a tappet-arm, $s$, provided preferably with adjustable tappet-screws $t$, adapted, as the shaft $r$ is rocked, to strike the weighted loosely-pivoted sleeve-starting lever $u$, and cause it, through one of its projections 7, to strike the collar $c$ of the sleeve with considerable force, to disengage the sleeve from the pinion in engagement with it, and shift the sleeve quickly when the weight completes the movement of the sleeve and engages it with the opposite pinion. This shifting of the sleeve takes place after the boxes are moved, while the crank-pins are moving through the slots 24, and the sleeve, it being removed from the strain and friction consequent upon moving the parts between it and the char-boxes, is moved easily.

It is not desired to limit this invention to the exact devices by which the boxes are shifted automatically in certain periods of time, for it is evident that other equivalent devices may be employed.

The sector might be provided with arms to connect with levers and move the boxes.

The mechanism for moving the boxes is so speeded and geared that the boxes are moved quickly into their different positions. The opening leading into the box being brought suddenly under the bottom of the tube allows the char in the tube to fall in mass and quickly fill the boxes, which prevents the tubes clogging, as would frequently happen if the char were permitted to issue from the tubes slowly and in a small stream.

It is obvious that the invention herein described might be modified by making the box stationary, and separating the plate 19 from it, and connecting it with the bottom plate, so that the plates 19 and 22 may be made movable with relation to the bottom and top of the box.

It will be observed that the nut $m$, which regulates the time of rest as it moves from one to the other finger $i\,k$, moves slowly; but when it reaches either finger it becomes practically a fixed part of the shaft, and rotates with rather than traverses along it, and this rotation of the nut and shaft together gives the boxes a quick movement.

We claim—

1. The combination, with cooling-tubes, of measuring-boxes arranged to intermittingly receive and measure, and subsequently discharge the char while the tubes are closed, substantially as described.

2. In an apparatus to measure char, a cooling-tube and a bottom plate for the measuring-box, in combination with a measuring-box provided with openings at bottom and top, and with a tube-closing plate, to operate in connection with the bottom of the tube, whereby the box may receive, measure, and discharge char intermittingly, substantially as described.

3. The combination, with the measuring-boxes and tube-closing plates, of mechanism to automatically move such plates to permit the char to be received intermittingly into the boxes, substantially as described.

4. The cooling-tubes and measuring-boxes, in combination with a screw-shaft and nut, and with devices, substantially as described, to connect the screw-shaft and boxes, so as to move the boxes intermittingly at any desired intervals of time, substantially as described.

5. In an apparatus to measure char, wherein the links connected with the devices for controlling the flow of char from the tubes are arranged to have lost motion, as described, the combination, with the sleeve and clutch pinions, of the weighted sleeve-starting lever and the tappet-arm to move it, substantially as and for the purpose described.

6. The combination, with the tubes and measuring-boxes, of a connecting-rod having lost motion between it and its operating mechanism, substantially as described.

7. The measuring-boxes, in combination with a screw-shaft, nut, and fingers, whereby the boxes may be retained at rest for the desired interval of time, and then be quickly shifted, substantially as described.

In testimony whereof we have signed our names to this specification in the presence of two subscribing witnesses.

OSCAR B. STILLMAN.
JOHN H. WEBSTER.

Witnesses:
G. W. GREGORY,
S. B. KIDDER.